(12) United States Patent
Lo

(10) Patent No.: US 10,412,367 B2
(45) Date of Patent: Sep. 10, 2019

(54) MULTI-LENS CAMERA WITH A SINGLE IMAGE SENSOR

(75) Inventor: Allen Kwok-Wah Lo, Hong Kong (CN)

(73) Assignee: 3D Media Ltd, Chai Wan (HK)

( * ) Notice: Subject to any disclaimer, the term of this patent is extended or adjusted under 35 U.S.C. 154(b) by 1622 days.

(21) Appl. No.: 13/566,292

(22) Filed: Aug. 3, 2012

(65) Prior Publication Data

US 2013/0033577 A1  Feb. 7, 2013

Related U.S. Application Data

(60) Provisional application No. 61/574,604, filed on Aug. 5, 2011.

(51) Int. Cl.
    *H04N 5/232* (2006.01)
    *G03B 13/00* (2006.01)
    *H04N 13/218* (2018.01)

(52) U.S. Cl.
    CPC ......... *H04N 13/218* (2018.05); *H04N 5/232* (2013.01)

(58) Field of Classification Search
    CPC .......................... H04N 13/0217; H04N 5/232
    USPC ................. 348/46, 36, 39, 348, 345
    See application file for complete search history.

(56) References Cited

U.S. PATENT DOCUMENTS

| | | | |
|---|---|---|---|
| 7,683,962 B2* | 3/2010 | Border et al. | 348/348 |
| 8,355,042 B2* | 1/2013 | Lablans | 348/36 |
| 8,400,555 B1* | 3/2013 | Georgiev | H04N 5/23212 348/222.1 |
| 8,885,059 B1* | 11/2014 | Venkataraman | H01L 27/14618 348/218.1 |

* cited by examiner

*Primary Examiner* — Trang U Tran
(74) *Attorney, Agent, or Firm* — Ware, Fressola, Maguire & Barber LLP

(57) ABSTRACT

A multiple-lens camera has only one image sensor to capture a number of images at different viewing angles. Using a single image sensor, instead of a number of separate image sensors, to capture multiple images simultaneously, one can avoid the calibration process to calibrate the different image sensors to make sure that color balance and the gain are the same for all the image sensors used. The camera has an adjustment mechanism for adjusting the distance between the image lenses, and a processor to receive from the image sensor electronic signals indicative of image data of the captured of images. The camera has a connector to transfer the processed image data to an external device or to an image display. The image display device is configured to display one of said plurality of images.

8 Claims, 2 Drawing Sheets

MULTI-LENS CAMERA WITH A SINGLE IMAGE SENSOR

CROSS-REFERENCE TO RELATED APPLICATION

This application claims the benefit of a provisional application, Ser. No. 61/574,604, filed Aug. 5, 2011.

FIELD OF THE INVENTION

The present invention relates generally to a multiple-lens camera and, more particularly, to a multiple-lens camera having only a single image sensor.

BACKGROUND OF THE INVENTION

In order to produce a 3D photograph, a camera must have two or more lenses to capture the images a scene at different angles. The captured images must be recorded on film or on an electronic medium.

SUMMARY OF THE INVENTION

The main aspect of the present invention is a camera having a plurality of imaging lenses arranged to form a plurality of images on an image plane and an image sensor disposed on the image plane to capture at least two of the images formed on the image plane. The number of imaging lenses can be N, which is a positive number greater than 1 and the image sensor is dimensioned to capture M images, where M is a positive integer smaller than or equal to N but greater than 1.

The camera has an adjustment mechanism for adjusting the distance between the image lenses, and a processor configured to receive from the image sensor electronic signals indicative of image data of said plurality of images.

The processor is configured to process the image data into processed image data, and the camera further comprises a connector for receiving electronic signals indicative of the processed image data and to transfer the electronic signals to an external device.

The camera also has an image display device configured to display one of said plurality of images.

DETAILED DESCRIPTION

Figure 1:
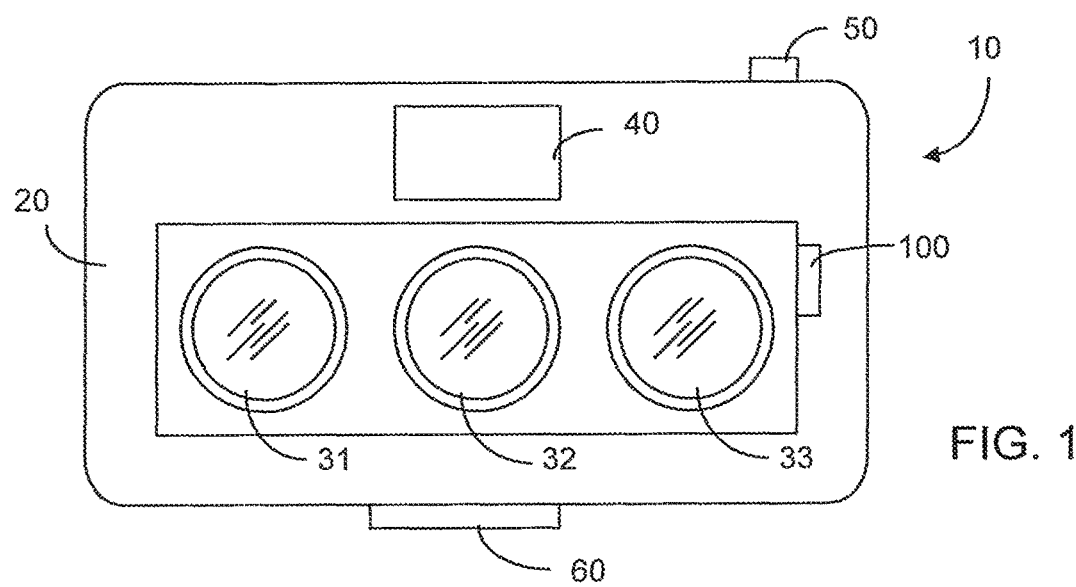
FIG. 1 is a front-view of the multiple-lens camera, according to the present invention.

The present invention is concerned with a camera having two or more imaging lenses capable of taking a plurality of images of the same scene at different viewing angles simultaneously. The multiple images can be used to compose a 3D picture, for example. The multiple-lens camera according to one embodiment of the present invention is shown in FIG. 1. As shown in FIG. 1, camera 10 comprises a housing 20 to accommodate two or more taking lenses or imaging lenses 31, 32 and 33 disposed adjacent to each other. All imaging lenses 31, 32 and 33 have the same focus length and they are arranged so that their image planes are substantially on the same plane. Camera 10 also has a shutter release button 50, and may have a flash unit 40 and a tripod mount 60.

Figure 2:
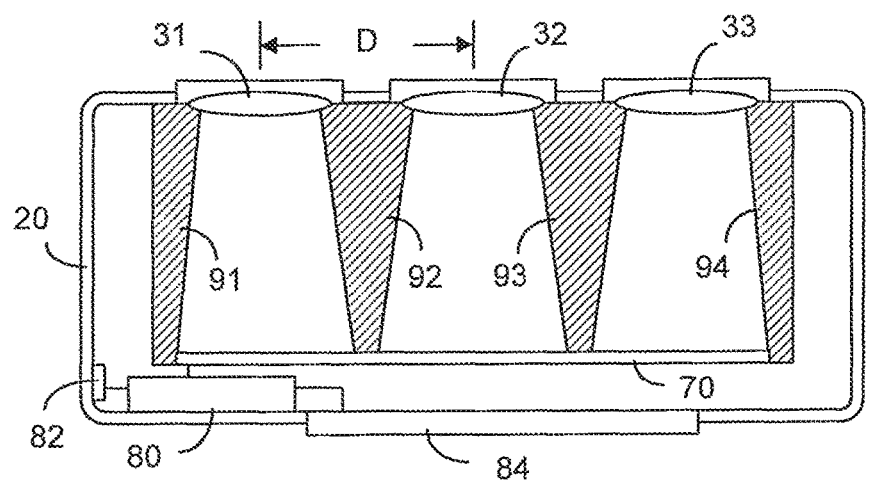
FIG. 2 is a schematic representation of the multi-lens camera.
Figure 3:
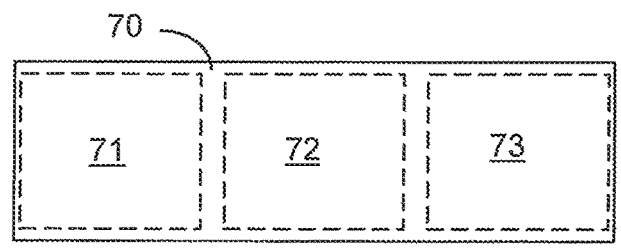
FIG. 3 shows a plurality of images formed on the single image sensor through different imaging lenses.

As shown in FIG. 2, camera 10 has only a single image sensor 70 located at the image plane of image lenses 31, 32 and 33. The image sensor 70 is dimensioned such that three images 71, 72 and 73 of the same scene but from different viewing angles can be formed simultaneously on the image sensor 70 as illustrated in FIG. 3. The image sensor 70 is an electronic device which is configured to convert the optical images formed on the sensor into electronic signals. Camera 10 also has an image storage/processor 80 electronically connected to the image sensor 70. The image storage/processor 80 is configured to receive the electronic signals indicative of image data from the image sensor 70. The image storage/processor 80 is also configured to process the image data into a form suitable for viewing and transferring, for example. Camera 10 has a connector 82 for transferring the processed image data to an exterior electronic device, such as a computer, a printer, a memory device or an image display unit (not shown). Camera 10 also has an electronic display 84, such as an LCD or light-emitting display unit, to show an image of the scene. In one embodiment of the present invention, camera 10 also has a plurality of light shields 91, 92, 93 and 94 to minimize the light entering one of the lenses from reaching outside the corresponding part of the image sensor 70.

The images 71, 72 and 73 can be used to compose a three-dimensional (3D) picture or to make a regular 2D picture. It is understood that the apertures of the multiple lenses 31, 32 and 32 can be made substantially the same size. As such, the exposure time and exposure value of each of the images 71, 72 and 73 is substantially the same as the exposure of the other images. Furthermore, the color balance of one image is practically identical to the color balance of the other.

Figure 4:
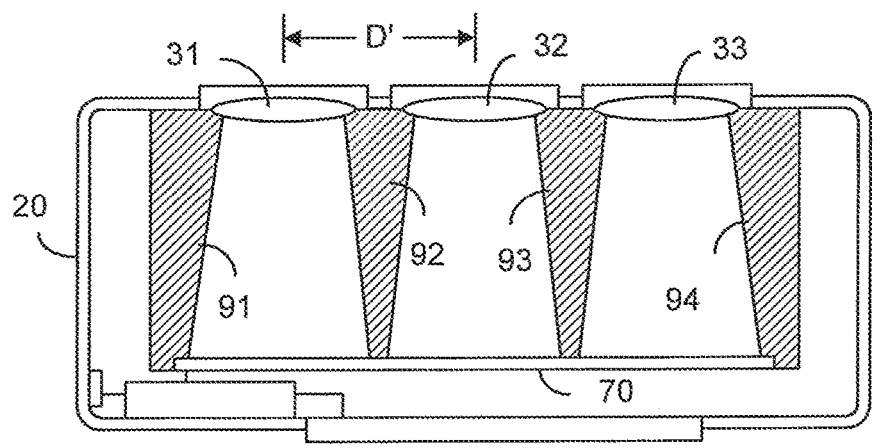
FIG. 4 shows that the distance between imaging lenses can be adjusted.
Figure 5:
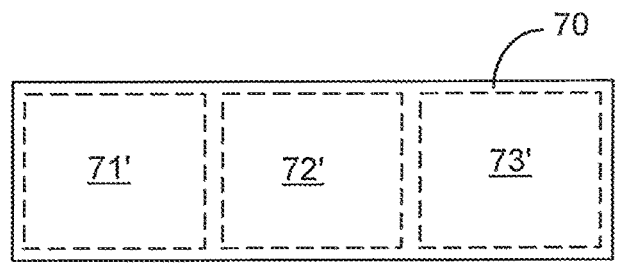
FIG. 5 shows the images formed on the single image sensor with the distance between imaging lenses adjusted.

In one embodiment of the present invention, the distance between adjacent lenses can be adjusted so as to control the amount of parallax between views. Thus, camera 10 may comprise an adjusting mechanism 100 to adjust the distance between lenses. For example, the distance between two adjacent lenses is D as shown in FIG. 2 and the images formed on the image sensor 70 are 71, 72 and 73 (FIG. 3). If the distance between adjacent lenses is reduced to D', as shown in FIG. 4, the images formed on the image sensor 70 are laterally shifted. The shifted images 71', 72' and 73' are shown in FIG. 5.

When a number of image sensors are used to capture a number of images, it is necessary to calibrate the different image sensors to make sure that color balance and the gain are the same for all the image sensors used. Using a single image sensor, instead of a number of separate image sensor, to capture multiple images simultaneously, one can avoid the above-mentioned calibration process.

It should be noted that FIGS. 1 to 5 are used for illustration purposes only. The number of imaging lenses can be two, three, . . . , ten or more. Nevertheless, the camera has only one imaging sensors to capture the images formed by all the imaging lenses.

Although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A camera, comprising:
 a plurality of imaging lenses arranged to form a plurality of images on a same plane; and
 a single image sensor disposed on said same plane, the image sensor dimensioned to capture at least two of said plurality of images simultaneously formed on the image sensor, wherein said plurality of imaging lenses are separated by a distance between adjacent imaging lenses, said camera further comprising:
 an adjustment mechanism, operatively connected to said plurality of imaging lenses, configured for adjusting the distance between adjacent imaging lenses.

2. The camera according to claim 1, where the number of imaging lenses is N, a positive integer greater than 1, and the image sensor is dimensioned to capture N images.

3. The camera according to claim 1, further comprising:
 a processor configured to receive from the image sensor electronic signals indicative of image data of said plurality of images.

4. The camera according to claim 3, wherein the processor is further configured to process the image data into processed image data, said camera further comprising:
 a connector configured to receive further electronic signals indicative of the processed image data and to transfer the further electronic signals to an external device.

5. The camera according to claim 1, further comprising:
 an image display device configured to display one of said plurality of images.

6. The camera according to claim 1, wherein each of said plurality of imaging lenses is arranged to form a different one of said plurality of images at an image plane substantially located on said same plane.

7. A camera, comprising:
 a plurality of imaging lenses arranged to form a plurality of images on a same plane; and
 a single image sensor disposed on said same plane, the image sensor dimensioned to capture at least two of said plurality of images simultaneously formed on the image sensor, wherein the plurality of images are views of a same scene at different viewing angles, and wherein the imaging lenses are arranged so that all of said plurality of images are substantially identical except for an amount of parallax between the views, and wherein the imaging lenses are separated by a lens distance between adjacent imaging lenses, said camera further comprising:
 an adjustment mechanism, operatively connected to said plurality of imaging lenses, configured for adjusting the amount of parallax between the views.

8. A camera, comprising:
 a plurality of imaging lenses arranged to form a plurality of images on a same plane, said imaging lenses separated by a lens distance;
 an adjustment mechanism operatively connected to said plurality of imaging lenses, and
 a single image sensor disposed on said same plane, the image sensor dimensioned to capture at least two of said plurality of images simultaneously formed on the image sensor, wherein the images formed on the image sensor are separated by an image distance corresponding to the lens distance, and the adjustment mechanism is configured for adjusting the image distance.

* * * * *